United States Patent [19]
Kilby

[11] 3,793,487
[45] Feb. 19, 1974

[54] SYSTEM FOR SCREENING TELEPHONE CALLS

[76] Inventor: Jack S. Kilby, 7723 Midbury, Dallas, Tex. 75230

[22] Filed: June 26, 1972

[21] Appl. No.: 266,490

Related U.S. Application Data

[63] Continuation-in-part of Ser. No. 200,804, Nov. 22, 1971.

[52] U.S. Cl. ............... 179/6 R, 179/6 E, 179/84 C, 179/89

[51] Int. Cl. ........................................... H04m 1/64

[58] Field of Search ... 179/6 E, 6 R, 6 AC, 6 C, 89, 179/84 C, 2 A

[56] References Cited

UNITED STATES PATENTS

| | | | |
|---|---|---|---|
| 3,187,108 | 6/1965 | Clin | 179/84 C |
| 2,715,161 | 8/1955 | Lutz | 179/84 C |
| 3,485,952 | 12/1969 | Walker | 179/2 A |
| 2,912,504 | 1/1959 | Dagnall | 179/6 R |
| 2,832,830 | 4/1958 | Cain | 179/6 R |
| 3,226,489 | 12/1965 | Grambsch | 179/89 |
| 3,033,941 | 5/1962 | Bell et al. | 179/89 |
| 3,064,085 | 11/1962 | Muramatsu | 179/89 |
| 3,445,600 | 5/1969 | Todd | 179/6 R |
| 3,501,592 | 3/1970 | Waldman | 179/6 R |
| 3,514,548 | 5/1970 | De Meo | 179/84 C |

*Primary Examiner*—Raymond F. Cardillo, Jr.

[57] ABSTRACT

A system for screening telephone calls is described which intercepts an incoming ring signal to prevent disturbing the called party. The system produces an off-hook condition and responds with a recorded announcement specifying the activity in which the called party is involved and indicating that he would prefer not to be interrupted, and also gives instructions as to how the calling party may nevertheless continue the call by initiating an additional dialed signal if he wishes. When the calling party initiates the additional signal specified by the instruction, preferably by dialing the digit "1," the called party is summoned to the telephone after a predetermined time delay. As an alternative to interrupting the called party, the calling party may record a message. The recorded announcement may be modified by the subscriber at any time to tailor the announcement to the occasion to enable the calling party to better use his judgment as to when to interrupt.

The system distinguishes between a pulse generated by the calling party hanging up and a single pulse signal dialed by the calling party to summon the called party by detecting a zero current condition on the line within a short interval after the pulse is received. The zero current condition indicates that the calling party elected to terminate the call rather than complete the call and is used to inhibit completion of the call.

14 Claims, 2 Drawing Figures

SYSTEM FOR SCREENING TELEPHONE CALLS

Figure 1:
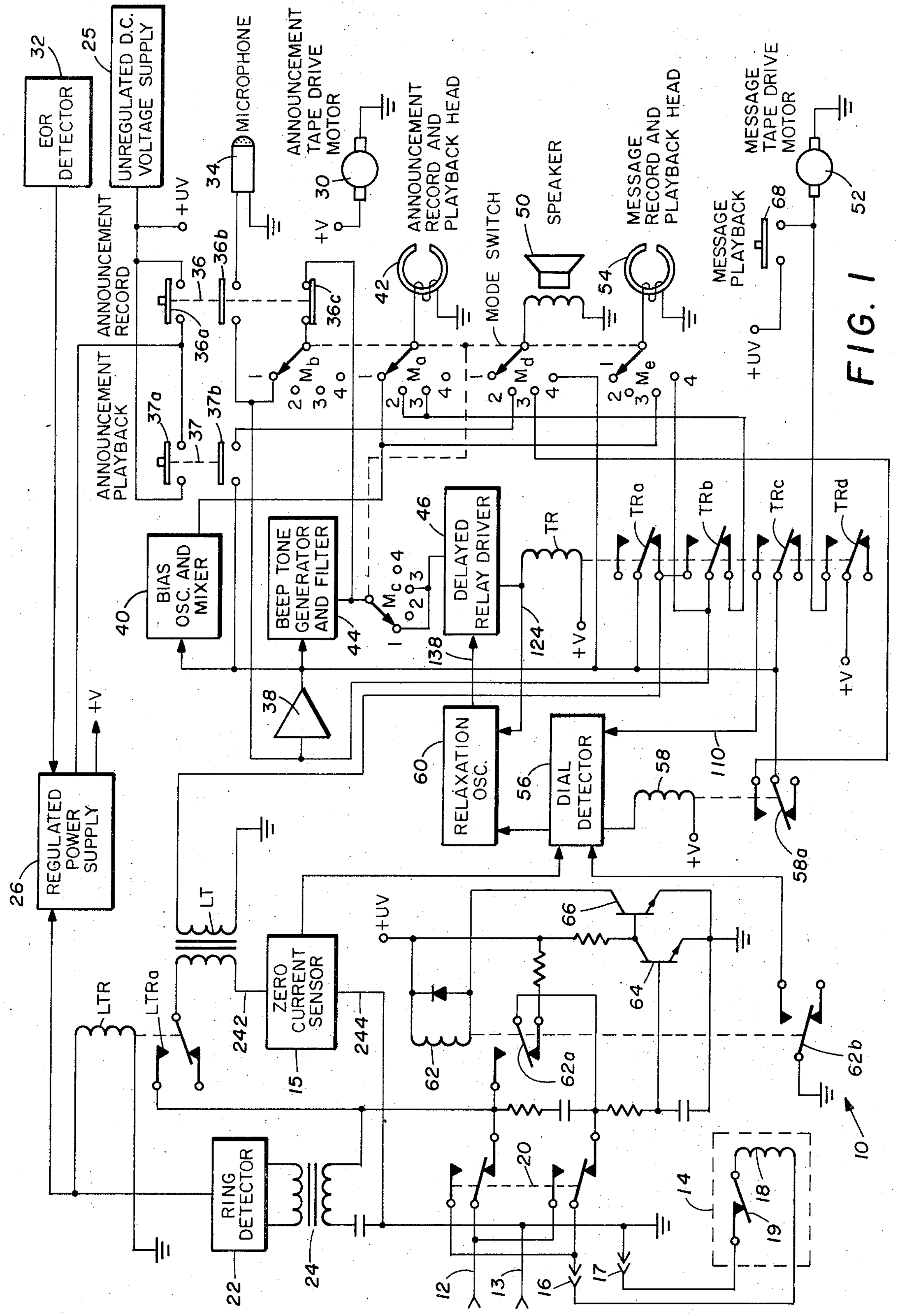

This is a continuation-in-part application of Ser. No. 200,804, entitled Telephone Answering System, filed on Nov. 22, 1971.

This invention relates generally to telephone systems, and more particularly relates to devices adapted to be connected to a local subscriber's telephone line for responding to incoming telephone calls.

A large number of devices have heretofore been proposed for automatically answering a telephone, responding with an announcement, and then recording a message. These devices have almost exclusively been concerned with answering the telephone automatically in the absence of the called party.

In an office, a major function of a secretary is often to screen incoming calls, permitting an executive to participate in a conference or work undisturbed, secure with the knowledge that he will be informed of important calls. In the home, or in offices where no secretaries are utilized, people are literally slaves to the telephone. When the telephone rings, all other activities must be interrupted while the telephone is answered. A telephone salesman or solicitor receives the same response as a caller with an emergency message. The telephone is the only appliance in the home without an on-off switch, but because of the possibility of emergency calls, such a switch cannot be used safely. However, most people will respect the wishes of the person they are calling if they know the person does not want to be disturbed, except when the call is important, such as in an emergency situation.

The invention described and claimed in the above referenced parent application is concerned with a system for intercepting, at the option of the telephone subscriber, an incoming ring signal by establishing an off-hook condition, and responding with a recorded announcement indicating that the called party would prefer not to be disturbed. Based on the content of the announcement, the calling party may then use his discretion as to whether to interrupt the called party by initiating an additional signal, which is detected by the system and used to summon the called party. The announcement preferably indicates the activity in which the called party is engaged, so as to assist the calling party in exercising his discretion, and also provides instructions as to how to summon the called party in the event the calling party wishes to complete the call. The system may also provide means for recording a message from the calling party to the called party as an alternative to dialing the additional digits to summon the called party.

In the system described in the above referenced application, it was considered desirable for the additional signal to have a substantial number of pulses, such as would be produced by dialing the digit nine with a rotary dial subscriber set, in order to dearly distinguish such a signal from others which might accidentally be placed on the line. However, it has been determined that a number of central switching systems disconnect the calling party in the event a digit is dialed in which the number of pulses is greater than two or three. Additionally, in many newer touch-tone systems, the transmission of the tones are suppressed, and only a single pulse is produced at the receiving set.

The present invention is concerned with an improved system of the type described in the above identified parent application wherein the additional signal initiated by the calling party to summon the called party may be a simple pulse of a type produced by dialing the digit "one" in either the conventional rotary dialing system, or the more recently installed touch-tone system, or by momentarily depressing the cradle switch of the set. The system first detects such a pulse signal, then after a short delay, typically about two seconds, initiates the audible signal to summon the called party to the telephone. However, if a zero current level is sensed in the line, which always occurs within about two seconds after the calling party hangs up, the dial detection signal is aborted and the audible signal is not produced. Thus, if the additional signal was caused by the calling party hanging up, the called party is not summoned to the telephone.

Figure 2:
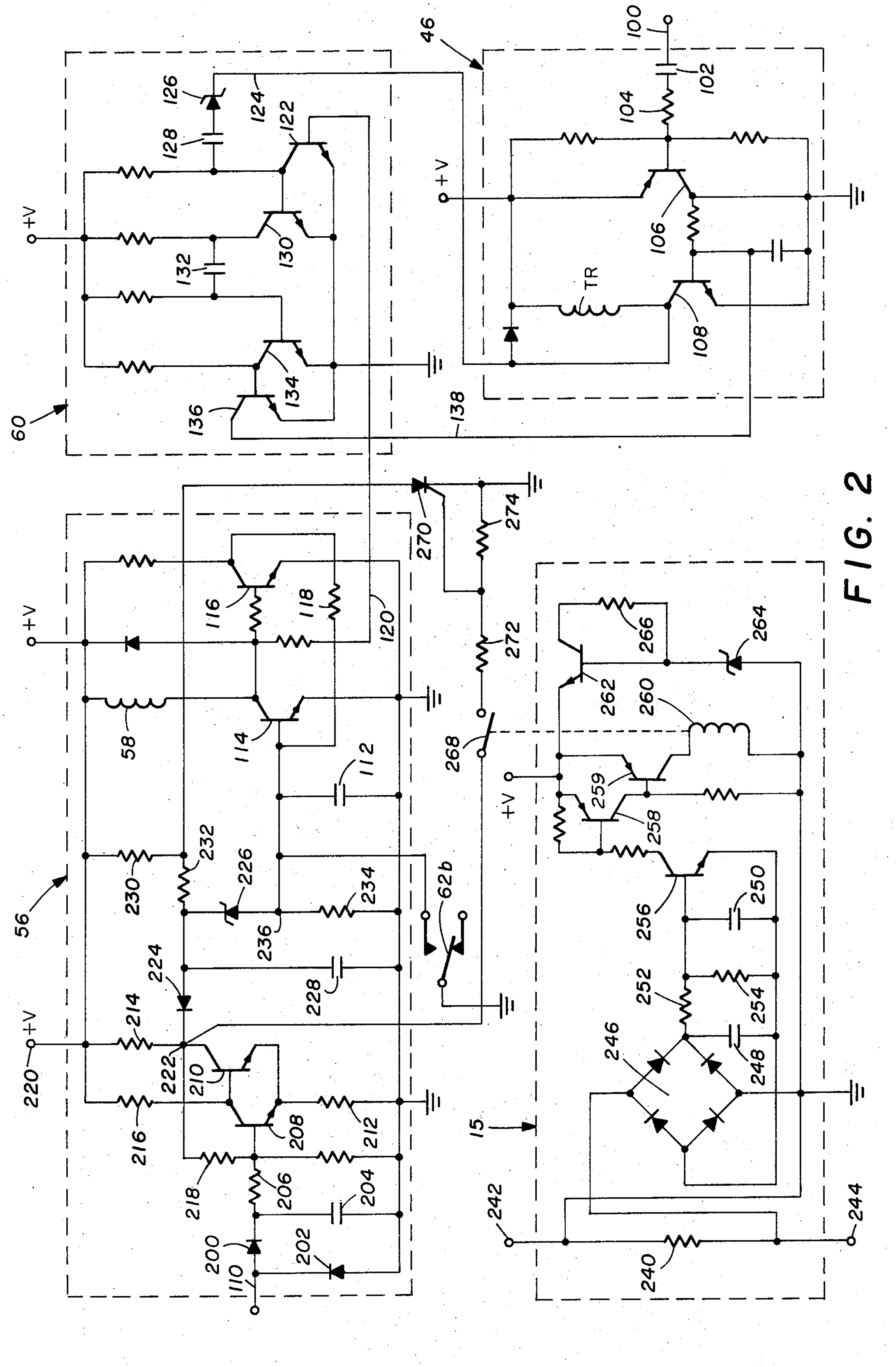

The novel features believed characteristic of this invention are set forth in the appended claims. The invention itself, however, as well as other objects and advantages thereof, may best be understood by reference to the following detailed description of illustrated embodiments, read in conjunction with the accompanying drawings:

FIG. 1 is a schematic diagram of a system in accordance with the present invention; and FIG. 2 is a detailed schematic diagram of a portion of the system illustrated in FIG. 1.

Referring now to the drawings, a system in accordance with the present invention is indicated generally by the reference numeral 10. The system 10 is connected to the subscriber's telephone set by connecting the incoming telephone lines to connectors 12 and 13 and connecting the subscriber's telephone set 14 to connectors 16 and 17. Only the cradle switch 19 and the secondary 18 of the line transformer of the set 14 are illustrated. The switch 19 is open when the hand set is on the hook, and closed when the hand set is lifted from the cradle by the called party, which is the off-hook condition.

The system 10 includes a double-pole, double-throw "on-off" switch 20 which is illustrated in the "on" position. When the switch 20 is thrown upwardly, the telephone set 14 is connected directly to the lines 12 and 13 and the device 10 is "off."

The system 10 has four separate modes of operation which may be selected by a four-position mode switch. The mode switch M has five separate wiper arms $M_a$-$M_e$ which are moved simultaneously by a single control knob. When the wipers $M_a$-$M_e$ are in position on the No. 1 contacts, which is the position illustrated, the system is in the "Announcement Record" mode. When the wipers are positioned on contacts No. 2, the system is in the "Announcement Playback" mode; when on contacts No. 3, the "Automatic Answer" mode, and when on contacts No. 4, the "Message Playback" mode.

The system 10 uses two separate magnetic tapes (not illustrated). One tape, referred to as an announcement tape, is used to store an announcement to be played to a calling party. The other tape, referred to as a message tape, is used to record any message the calling party may wish to leave. An amplifier 38 of conventional design is active in all modes of operation as will hereafter be described. A bias oscillator and mixer 40 is connected to the output of the amplifier 38 and is used in the conventional manner for recording upon either the announcement tape or the message tape.

The announcement tape is operated by an announcement tape drive motor 30. Announcements are recorded on the tape and reproduced from the tape by an announcement record and playback head 42. The announcement tape is an endless tape having a suitable "end of record" indicator, such as a metallic strip, for purposes which will presently be described. A microphone 34 is used to input audio signals to the device 10 for recording announcements as will hereafter be described.

The message tape may be a conventional cassette tape, and is operated by a message tape drive motor 52. Messages may be recorded upon and reproduced from the message tape by a message record and playback head 54.

A speaker 50 is used to output any audio signal from the device 10, including the playback of announcements and messages, and to summon the subscriber to the phone when operating in the automatic mode, all of which will hereafter be described in detail.

An "Announcement Record" switch 36 has contacts 36*a*, 36*b* and 36*c*. When the push-button type switch 36 is depressed, contact 36*a* connects an unregulated voltage supply 25 to a regulated power supply 26. This energizes the regulated power supply 26 which starts the announcement tape drive motor 30. Contact 36*b* connects the microphone 34 to the input of the amplifier 38. Normally closed contact 36*c* disconnects the output of a beep-tone generator and filter 44 from the input of the amplifier 38.

An announcement playback switch 37 has normally open contacts 37*a* and 37*b*. When the announcement playback switch 37 is depressed, contact 37*a* connects the unregulated voltage supply to the regulated power supply 26 to energize the regulated power supply 26 and thus cause the announcement tape drive motor 30 to operate. Contact 37*b* connects the output of amplifier 38 to contact No. 2 of the mode switch $M_a$.

As mentioned, the endless magnetic announcement tape (not illustrated) is driven by announcement drive motor 30 whenever the regulated power supply is energized. As soon as the announcement tape is moved in response to the regulated power supply being energized, the end of recorder detector 32 maintains the power supply 26 energized until the endless tape has made one complete revolution and the end of tape is again detected. Then the regulated power supply is turned off to deactivate the device 10. Thus, the device 10 can be active only for the period of time required for the endless announcement tape to make one complete cycle, which limits the length of time that the unit can summon the called party to the telephone, or limits the length of any message which can be recorded on the message tape by the calling party, as will hereafter be described.

A ring detector circuit 22 is coupled to the telephone lines 12 and 13 by way of transformer 24. Upon receiving a ring signal, the ring detector 22 energizes a line transformer relay LTR and also energizes the regulated power supply 26 to start operation of the announcement tape drive motor 30. When relay LTR is energized, a line transformer LT and a zero current sensor 15 are connected across the telephone lines 12 and 13 by contacts LTR*a*. The output of the amplifier 38 is also connected to a beep-tone generator and filter circuit 44. The circuit 44 has two modes of operation. In the first mode, the circuit 44 is connected in a loop with the amplifier to generate a beep-tone which is recorded on the announcement tape. In the second mode, the circuit detects the beep-tone reproduced from the announcement tape by the head 42 and the amplifier 38, and operates a delayed relay driver 46. The delayed relay driver 46 energizes the transmit-receive relay TR which has contacts TR*a*–TR*d*, which are illustrated in the normal or de-energized position, which is the transmit condition. The delayed relay driver 46 actuates relay TR after approximately one second.

A dial detector circuit 56 is provided to detect a signal transmitted by the calling party in response to the announcement. For example, the dial detector 56 may detect when the digit "one" is dialed. After a delay of about two seconds, the dial detector actuates a relay 58 in response to detecting the digit "one." The relay 58 has a single pair of normally open contacts 58a. The dial detector 56 also enables a relaxation oscillator 60 until such time as the dial detector 56 is disabled by contact 62*b* of relay 62 which will presently be described.

The dial detector 56 may be disabled during the delay period by the zero current detector 15. It has been determined that one feature which appears to be common to many telephone systems is that the line current momentarily goes to zero within about two seconds after a hand set is placed on the cradle. Thus if the dial detector should be actuated by a single pulse produced by the calling party hanging up, the sensing of the zero current level and disabling of the dial detector during the delay period precludes an audible signal being produced to summon the called party to the telephone.

The relaxation oscillator 60 is connected in a loop with the delayed relay driver 46 so as to cause the relay driver 46 to operate relay TR in approximately one second "on" and one second "off" intervals to produce an interrupted beep-tone which is broadcast by speaker 50 to summons the called party to the telephone as will presently be described.

The delayed relay driver 46, the dial detector 56, the zero current sensor 15, and the relaxation oscillator 60 are shown in detail in FIG. 2. The output from the beep-tone generator and filter 44 is coupled by way of either mode switch contacts M*c*–1 or M*c*–3 to the input 100 of the delayed relay driver 46. The beep-tone signal is passed through a capacitor 102 and resistor 104 and turns transistor 106 "on." The collector of transistor 106 is coupled to the base of transistor 108, which controls relay TR. Relay TR is energized approximately one second after a beep-tone is applied to input 100.

The input 110 of the dial detector 56 is connected through contacts TRc to the output of the amplifier 38 when relay TR is energized.

When an additional signal, such as the pulse produced by dialing the digit "one," is transmitted by the calling party in response to the instructions of the announcement, the pulse is applied to an amplitude doubler comprised of diodes 200 and 202 and a capacitor 204 connected as illustrated in the detailed circuit diagram of FIG. 2. The output of the amplitude doubler is connected through a resistor 206 to the base of a transistor 208. Transistors 208 and 210, together with biasing resistors 212, 214, 216 and latching resistor 218, form a Schmitt trigger. When power is applied to the terminal 220 as a result of an incoming call being detected by ring detector 22, transistor 208 is off and transistor 210 is on. The Schmitt trigger switching level is set so that it will not trigger on amplitudes produced by normal voice signal levels. However, the Schmitt trigger will activate if a pulse of the magnitude produced by the dialing operation at the calling end of the line is received. A single pulse is adequate to trigger the circuit. Thus the circuit will detect when the digit "one" is dialed by the calling party, whether the dialed digit is generated by a touch tone or rotary dial type subscriber set. The circuit will also detect a momentary reclosing of the cradle switch, which can be used as the secondary signal transmitted by the calling party. Since the latching Schmitt trigger must be made very sensitive, it will also be triggered by the pulse produced when the calling party hangs up, thus requiring a means for detecting such an event to prevent the call from being erroneously completed.

As mentioned, when a pulse is detected, transistor 208 switches on and transistor 210 switches off, and the trigger circuit remains in this latched state until voltage is removed from terminal 220 at the end of the cycle as will presently be described. The output 222 of the Schmitt trigger is applied to a time delay circuit comprised of diodes 224 and 225, capacitor 228 and resistors 230, 232 and 234. When voltage is applied to the terminal 220 after the ring detector 22 has detected the initial call-up, transistor 210 is on as previously described. Current through diode 224 and transistor 210 thus limits the voltage level to which capacitor 228 can be charged. This level is typically limited to approximately one volt. When a pulse is received and the Schmitt trigger fired, transistor 210 turns off as previously described, thus reverse biasing diode 224. This permits capacitor 228 to charge positively as a result of current through resistors 230 and 232. When the capacitor 228 has charged to approximately five volts, which typically requires about two seconds, the junction 236 between Zener diode 226 and resistor 234, which may be considered the output of the delay circuit, will be at a value of about 0.6 volts, which is sufficient to turn transistor 114 on. This turns transistor 116 off so that feedback through resistor 118 holds transistor 114 on to keep the relay 58 energized until the power +V is removed at the end of the cycle. When relay 58 is energized, the output of the amplifier 38 is connected by contacts **58*a*** and mode switch contacts M*d*–3 to the speaker. Transistor 116 is also turned on, which latches transistor 114 in the "on" condition as a result of the feedback loop 118 to maintain a low voltage on output 120 until contacts **62*b* are closed as hereafter described to short the base of transistor 114 to ground. The output 120 of the dial detector 56 is connected to the base of transistor 122. When transistor 114 is off, transistor 122 is "on" and the relaxation oscillator 60 is disabled. However, when transistor 114 is turned "on," transistor 122 is turned "off" to enable the oscillator 60. The output from the delayed relay driver 46 is coupled by line 124 through a Zener diode 126 and capacitor 128 to the base of transistor 130. The collector of transistor 130 is coupled by capacitor 132 to the base of transistor 134, the collector of which is in turn connected to the base of transistor 136. Transistor 136 is coupled by line 138 to the base of transistor 108 of the delayed relay driver 46 so that transistor 108 is turned off approximately one second after it is turned on by the beep-tone. The operation of the circuit illustrated in FIG. 2 is hereafter described in greater detail in connection with the overall operation of the system 10.**

The delay circuit is disabled from activating the dial detector latch transistor 114 when the zero current sensor 15 senses a zero current. The zero current sensor 15 utilizes a resistor 240 connected in series with the primary winding of the line transformer LT by lines 242 and 244 as a current detector. The voltage produced across the resistor 240 by line current is rectified by a full wave rectifier bridge 246. The rectifier bridge is required because the line can have either polarity and a known polarity is required for input to a resistor-capacitor integrating circuit comprised of capacitors 248 and 250 and resistors 252 and 254. The values of these elements and the biasing circuit for transistor 256 are selected such that the transistor 256 will turn off only if the current through the resistor 240 is zero for some predetermined minimum time, such as five milliseconds. When transistor 256 turns off in response to a zero current condition, transistor 258 also turns off, which turns transistor 259 on to energize relay 260. Transistor 262, Zener diode 264 and resistor 266 provide a voltage regulator for the circuit. When energized, the relay coil 260 closes a pair of normally open contacts 268. This fires an SCR 270 by way of resistor 272, which shorts the junction between resistors 230 and 232 to ground, thus discharging any voltage stored on capacitor 228 and preventing transistor 114 from turning on. Resistor 274 permits the SCR 270 to reset after the power supply 26 has been turned off at the end of a cycle as will presently be described.

The relay 62 is energized when the switch 19 of the telephone set 14 is closed as a result of the receiver being lifted from the hook. It will be noted that when switch 19 is closed, transistor 64 is turned "off" and transistor 66 turned "on" to energize relay 62. Relay 62 has contacts **62*a* and 62*b*. When relay 62 is energized, contact 62*a* moves upwardly to connect the telephone set 14 to the telephone lines 12 and 13. Contact 62*b* grounds the dial detector 56** to reset it to the inactive condition.

The message tape drive motor is connected to the regulated power supply whenever relay TR is energized and is thus in the receive mode by contacts TRd. The message tape drive motor 52 may also be energized by the message playback switch 68.

The portions of the circuit not illustrated in detail are of conventional design, and are exemplified by the "Ansaphone 540" manufactured by Dictaphone.

OPERATION

In the operation of the system 10, assume first that an announcement is to be recorded on the announcement tape. The system 10 is placed in the Announcement Record mode by rotating the mode switch so that the wipers $M_a$–$M_e$ are positioned on contacts No. 1. Mode switch contacts M*a*–1 then connects the announcement record and playback head 42 to the output of the bias oscillator and mixer 40. The microphone 34 is connectable through the normally opened contact **36*b* of the announcement record switch 36 to the input of the amplifier 38. The output from the beep-tone generator and filter 44 is connected through normally closed contacts 36c to the input of the amplifier 38.**

Thus, when the announcement record button 36 is depressed, contact **36*a* connects the unregulated voltage supply +UV to the regulated power supply 26 and powers up the circuit by energizing line +V. This immediately starts the announcement tape drive motor in operation. As soon as the endless tape has moved from the end of record position, the EOR detector 32 keeps the regulated power supply 26 operating until the announcement tape has gone through a complete cycle and the end of the endless tape is again detected by detector 32. The message spoken into the microphone 34 is then applied through contact 36b to the input of amplifier 38 and through the bias oscillator and mixer 40 to the announcement record and playback head 42** by way of mode switch contacts M*a*–1. Contacts 36*c* of the announcement record button interrupts the loop from the beep-tone generator and filter 44 back to the input of the amplifier 38. A typical message to be recorded on the announcement might be: "Mr. Kilby is in conference. If you wish to interrupt him, you may do so by dialing one. If not, please leave your name and phone number after the tone and he will return your call later."

After the message is recorded, the announcement record button 36 is released. This disconnects the microphone from the input of the amplifier 38 and closes the loop from the output of the beep-tone generator and filter back to the input of the amplifier 38 so that a beep-tone is generated at the output of the amplifier. Although contact 36a is again open, it will be recalled that the end of record detector 32 keeps the regulated power supply 26 energized until such time as the end of record is again detected. When the end of the tape is detected, the power supply 26, and thus announcement tape drive motor 30, is deenergized. As a result, the beep-tone is recorded on the remainder of the announcement tape.

The announcement recorded on the announcement tape may be played back when the mode switch is in position at the No. 2 contacts by merely pressing the announcement playback push-button 37. With the mode switch in position No. 2, the announcement record and playback head 42 is connected by way of contact M*a*–2 and contact TR*b* to the input of the amplifier 38. The output of amplifier 38 is then connectable by way of push-button contact 37*b* and mode switch contact M*d*–2 to the speaker 50. Thus, when the announcement playback push-button 37 is depressed, the regulated power supply 26 is activated which in turn energizes the announcement tape drive motor. The signal reproduced by the announcement record and playback head 42 is applied to the input of the amplifier 38, and the output of the amplifier is connected to the speaker 50. After the announcement has been played back, the push-button 37 may be released to disconnect the speaker from the output of the amplifier so that the beep-tone is not reproduced. However, the anoucement tape drive motor 30 will continue to operate until the EOR detector 32 detects the starting point of the endless announcement tape.

The Automatic Answer mode is selected by moving the mode switch wipers to contacts No. 3. In this mode, an incoming ring signal is detected to start the sequence. Next the line transformer LT is connected to the telephone line, which simulates lifting the handset from the cradle. The recorded announcement is then played over the line to the calling party. This is followed by a one-second beep-tone indicating that the announcement has terminated. The calling party then decides if he wishes to interrupt the called party. If so, he dials a digit such as "one" which activates a signal audible to the called party. When the called party lifts the handset from the cradle, the off-hook condition is detected and the audible signal terminated. When the conversation is complete and the handset is returned to the cradle, the on-hook condition is detected and the set disconnected from the line. If the calling party elects not to interrupt the called party, he may, at his option, leave a message during the remaining portion of the cycle defined by the length of the announcement tape.

In the Automatic Mode, relay 62 is initially deenergized so that contacts 62a disconnect the telephone set 14 from the telephone lines 12 and 13. However, the telephone lines 12 and 13 are connected across the primary of transformer 24. When a ring signal comes in on lines 12 and 13, the ring detector 22 activates the regulated power supply 26 and also energizes the line transformer relay LTR. Relay LTR then connects the line transformer LT across the telephone lines 12 and 13.

When the regulated power supply 26 is activated by the ring detector 22, the announcement tape drive motor 30 is immediately energized. As soon as the announcement tape has moved the end of record detector 32 maintains the regulated power supply 26 operative. The announcement recorded on the announcement tape is then reproduced by the announcement record and playback head 42 and directed through mode switch contacts M*a*–3 and contact TR*b* to the input of amplifier 38. The output of amplifier 38 is connected by way of contact TRa to the line transformer LT so that the announcement is transmitted to the calling party. Upon completion of the announcement, the beep-tone recorded on the announcement tape is detected by the filter function of the beep-tone generator and filter 44 and activates the delayed relay driver 46. After transmitting the recorded beep to the calling party for approximately one second, the transmit receive relay TR is energized by the delayed relay driver 46 and switches to the receive condition.

In the receive condition, the line transformer is coupled through contacts TRb to the input of amplifier 38. The output of amplifier 38 is coupled through contacts TRc to the input of the dial detector 56. The output of the bias oscillator and mixer is also connected by way of mode switch contact ME–3 to the message record and playback head 54, and the message drive motor 52 is connected to the regulated power supply 26 by contacts TRd. As a result, the calling party has the option of either dialing the specified digit "one" to speak with the called party or may record a message.

Assume that the calling party wishes to interrupt the called party. In that case, the digit one is dialed and two pulses are transmitted over the telephone lines, through the line transformer LT, the amplifier 38 and contacts TRc to the input 110 of the dial detector 56 shown in FIG. 2. The first pulse is of sufficient magnitude to trigger the latching peak detector which includes transistors 208 and 210 so that transistor 210 is turned off. As a result, current through resistor 230 and 232 charges capacitor 228 of the delay circuit until the output 236 is sufficiently positive to turn transistor 114 on after a lapsed period of about two seconds. The transistor 114 is then latched in the on condition by the feedback resistor 118 when transistor 116 turns off. When transistor 114 is switched on, relay 58 is energized to close contacts 58a coupling the output of amplifier 38 to the speaker 50.

When transistor 114 is latched in the "on" condition, transistor 122 of the relaxation oscillator 60 is turned "off," thus enabling the relaxation oscillator 60. When the dialed digit was detected, relay TR was energized and therefore was in the receive condition. However, when transistor 122 is turned "off," transistor 130 is turned "on," transistor 134 is turned "off" and transistor "136" is turned on so that transistor 108 is turned "off." This causes relay TR to switch from the "receive" condition to the "transmit" condition. Since the announcement tape drive motor 30 is continuing to operate, the beep-tone previously recorded on the announcement tape is again reproduced by the announcement record playback head 42 and transferred through contact TRb to the amplifier 38. The output of amplifier 38 is connected through contacts 58A, and MD3 to speaker 50 so that the beep-tone is broadcast to the called party. At the same time, the reproduced beep-tone is again detected by the beep-tone generator and filter 44, which signal is applied to input 100 and again switches transistor 108 "on" after about one second and returns relay TR to the "receive" condition so that the beep-tone is not broadcast over the speaker 50. When transistor 108 is turned off, the transition at the collector is coupled through diode 126 and capacitor 128 to turn transistor 130 "on." This signal ripples through the relaxation oscillator 60 and turns transistor 108 "off" after about one second. This repeats the cycle. As a result, the beep-tone previously recorded on the announcement tape is broadcast by the speaker 50 at intervals of approximately one second "on" and one second "off," providing a loud audio signal to notify the subscriber that he has a call. If desired, voltages could be provided to ring the conventional bell in the handset 14. The interrupted beep-tone continues until the called party lifts the receiver from the hook to close switch 15, or until the end of record detector 32 detects the end of the endless announcement tape and disables the regulated power supply 26 to power down the device 10.

If the called party lifts the receiver from the hook of the telephone set 14 to close contact 19, relay 62 will be energized when transistor 66 is switched on. In such a case, contacts 62*a* connect the telephone set 14 to the telephone lines 12 and 13 and the conversation may be conducted in the normal manner. When contacts 62*b* close the dial detector 56 is reset by turning transistor 114 "off," which in turn disables the relaxation oscillator 60 by turning transistor 122 "on," and terminates the broadcast of the interrupted beep-tone by the speaker 50. The announcement tape drive motor 30 continues, however, to drive the tape until the end of record detector 32 detects the end of the tape and disables the regulated power supply 26.

If on the other hand, the calling party elects to leave a message, he may do so because the line transformer LT is connected to the input of the amplifier 38 by way of contacts TRb. The output of the bias oscillator and mixer 40 is connected to the message record and playback head 54 by mode switch contacts ME–3. As previously mentioned, the message tape drive motor 52 is operated whenever transmit receive relay TR is in the receive condition by way of contact TR*d*.

If the calling party elects not to disturb the called party and does not wish to leave a message, he will hang up. In such an event, the act of placing the handset back on the cradle may produce a pulse which will cause transistor 208 of the dial detectors circuit 56 to be switched on in the same manner as if the digit one had been dialed to summon the called party. However, each time the calling party hangs up to terminate the call, the current in the telephone line, and thus through the primary of the line transformer LT, goes to a zero level within about two seconds of the pulse produced by placing the handset on the cradle. Thus before transistors 114 and 116 can be switched by the output 236 of the delay circuit, the zero current sensor 215 energizes the relay coil 260 to close the normally open contacts 268. This fires SCR 270 which prevents the build-up of a voltage on the capacitor 228 so that the transistor 114 is disabled and cannot be turned on to summon the called party.

The use of the zero current sensor 15 to detect when a calling party hangs up enables the dial detector to be designed to respond to substantially any pulse of the predetermined amplitude, thus permitting it to be activated by dialing the digit one, or by momentarily closing the cradle switch of a calling handset. Thus the device 10 can be used with substantially any type of telephone system, including those of the "Touch-tone" type, since all systems provide the capability of producing a short pulse by dialing the digit one, momentarily depressing the hook-switch, or even speaking a word without causing a disconnect. In any event, the detected signal will not be effective until after a time delay sufficient to detect that the calling party has terminated the call.

Messages recorded on the message tape may be played back by switching the mode selector switch to contacts No. 4 and depressing the message playback button 68. With the mode selector switch at contacts No. 4, the message record and playback head 54 is connected by way of mode switch contact M*e*–4 to the input of amplifier 38. The output of amplifier 38 is connected by way of mode switch contact M*d*–4 to the speaker 50. When the message playback button 68 is depressed, the message tape drive motor 54 is operated directly from the unregulated voltage supply.

From the above detailed description of a preferred embodiment of the invention, it will be appreciated that a unique automatic telephone answering device has been described. The device provides a system for intercepting an incoming ring signal so as to prevent the called party from being disturbed. The device provides the means for advising the calling party of the specific activity in which the called party is engaged at the moment. The calling party may then use his judgment as to whether to interrupt the called party. While such a procedure does not prevent the calling party from interrupting the called party in an emergency situation, it does discourage frivolous interruptions such as those made by telephone salesmen and solicitors, and provides friends with information which allows them to use their judgment as to whether to complete the call. In addition, the calling party may be given the option of leaving a returned call or other message. Since the device permits recording an updated announcement, the announcement can indicate that the called party is not at home and indicate that a message may be left, without giving instructions as to how to summon the called party to the telephone.

The device of the present invention is useful in business environments where no one is available to screen calls for executives in conference, or who are otherwise occupied. The device is also particularly suitable for use in the home where an individual does not wish to be disturbed during unusual sleeping hours, during meals or the like. Yet, the device permits emergency calls to reach the home at any time.

Although the preferred embodiment of the invention has been described in detail, it is to be understood that various changes, substitutions and alterations can be made therein without departing from the spirit and scope of the invention as defined by the appended claims.

What is claimed is:

1. In a telephone answering system:

means responsive to an incoming ring signal for establishing an off-hook condition, means for responding to the caller with a recorded announcement when the off-hook condition has been established, means responsive to an additional signal transmitted at the option of the caller and initiating a time delay period, for signaling an incoming call after the predetermined time delay period, and means for detecting the termination of the call by the calling party during said time delay period and inhibiting the means for signaling an incoming call.

2. The telephone answering system of claim 1 further characterized by electrical means for preventing the ring of the bell within the subscriber handset in response to an incoming ring signal.

3. The telephone answering system of claim 1 wherein the additional signal is dialed by the caller using a conventional handset.

4. The telephone answering system of claim 1 further characterized by means for recording a message after the first mentioned means has responded with a recorded announcement as an alternative to transmitting the additional signal.

5. In a telephone answering device, the combination of:

record means for reproducing a recorded announcement, means responsive to a ring signal for establishing an off-hook condition, means coupling the record means to a telephone line, when an off-hook condition is established, means for initiating the recorded announcement after the ring signal, means for detecting a pulse signal generated by the telephone set of the calling party and initiating a predetermined time delay period for initiating a signal to summon the called party to the telephone after the predetermined time delay, means for detecting a zero current level in the telephone line and disbabling the initiation of the signal to summon the called party if the current in the telephone line goes to zero during the delay, and means for connecting the telephone set to the telephone line in response to the called party answering the telephone in response to the signaled incoming call.

6. The telephone answering system of claim 5 further characterized by electrical means for preventing the ring of the bell within the subscriber handset in response to an incoming ring signal.

7. The combination of claim 5 further characterized by means for recording a message from the calling party as an alternative to transmitting the dialed signal.

8. In a telephone answering device, the combination of:

announcement recording means for storing an announcement, audio amplifier means for recording on and reproducing from the announcement recording means, transformer means for coupling the device to a telephone line, ring signal detector means for detecting an incoming ring signal and connecting the transformer means to a telephone line in response to an incoming ring signal, dial detector means for detecting a signal transmitted by the calling party and initiating a predetermined time delay period, means for initiating a signal to summon the called party after the time delay period, zero current sensing means for sensing a zero current level in the telephone line during the predetermined time delay and disabling the means for initiating te signal to summons the called party, Circuit means having:

a transmit mode for coupling the announcement recording means to the input of the amplifier means to the telephone line in response to a ring signal being detected by the ring signal detector means, a receiving mode for coupling the telephone line to the input of the amplifier means and the output of the amplifier means to the dial detector in response to termination of an announcement, and means responsive to the called party answering the telephone for connecting the telephone to the telephone line.

9. The combination of claim 8 further characterized by message recording means, and wherein the circuit means connects the output of the amplifier means to the message recording means in the receive mode.

10. In a telephone system, the combination of:

means for interconnecting a calling subscriber station and a called subscriber station in response to a request from a calling party and for transmitting a ring signal to the called subscriber station, the called subscriber station comprising:

means for automatically answering the ring signal with a recorded announcement and conditioning the called subscriber station to receive an additional signal dialed from the calling subscriber station, means for detecting an additional dialed signal transmitted from the calling subscriber station and initiating a predetermined time delay, means for indicating an incoming call at the called subscriber station after the predetermined time delay, means for detecting a zero current level in the telephone line, and means for disabling the means for indicating an incoming call if the current in the telephone line goes to zero during the predetermined time delay.

11. The combination of claim 10 wherein the called subscriber station includes:

means for preventing an audible signal in response to the ring signal.

12. The combination of claim 11 wherein the called subscriber station is further characterized by means for recording a message as an alternative to receiving the additional signal.

13. In a telephone answering system, the combination of:

means for detecting an incoming ring signal and establishing an off-hook condition, means for detecting an additional signal originated by the calling party and initiating a predetermined time delay period, means for initiating a signal to summon the called party to the telephone after the predetermined delay, means for detecting a zero current level in the telephone line, and means for preventing the initiation of the signal to summon the called party if the current in the telephone line goes to zero during the predetermined time delay period.

14. The combination of claim 13 wherein:

the means for detecting an additional signal comprises a first latch responsive to a pulse on the line for establishing a first condition, delay means initiated by the first condition and producing a second condition after a predetermined delay, a second latch responsive to the second condition for producing a third condition which initiates the signal to summon the called party, and wherein the means for preventing the initiation of the signal to summon the called party disables the delay means from producing the second condition.

* * * * *